United States Patent [19]

Doyle

[11] 4,171,043
[45] Oct. 16, 1979

[54] TRANSFER MECHANISM
[75] Inventor: John P. Doyle, Macclesfield, England
[73] Assignee: Sheppee Engineering Limited, York, England
[21] Appl. No.: 816,343
[22] Filed: Jul. 18, 1977
[30] Foreign Application Priority Data
  Jul. 29, 1976 [GB] United Kingdom ............... 31551/76
[51] Int. Cl.² .......................................... B65G 47/26
[52] U.S. Cl. .................................................. 198/430
[58] Field of Search ............... 198/426, 429, 430, 487, 198/740

[56] References Cited
U.S. PATENT DOCUMENTS

| | | | |
|---|---|---|---|
| 1,853,417 | 4/1932 | Hall | 198/430 |
| 2,080,858 | 5/1937 | Dorman | 198/430 |
| 3,040,867 | 6/1962 | Posten et al. | 198/430 |
| 3,960,266 | 6/1976 | Becker | 198/430 |
| 4,067,434 | 1/1978 | Mumford | 198/430 X |

FOREIGN PATENT DOCUMENTS 974630 11/1964 United Kingdom ..................... 198/430

Primary Examiner—James B. Marbert
Assistant Examiner—James L. Rowland
Attorney, Agent, or Firm—Charles F. Pigott, Jr.

[57] ABSTRACT

A pusher bar transfer mechanism supporting the pusher bar on a suspension capable of oscillation in mutually perpendicular planes and guided to move the pusher bar in a transfer of a row of articles with a component of motion parallel to the row and a component transverse thereto in the transfer direction.

15 Claims, 3 Drawing Figures

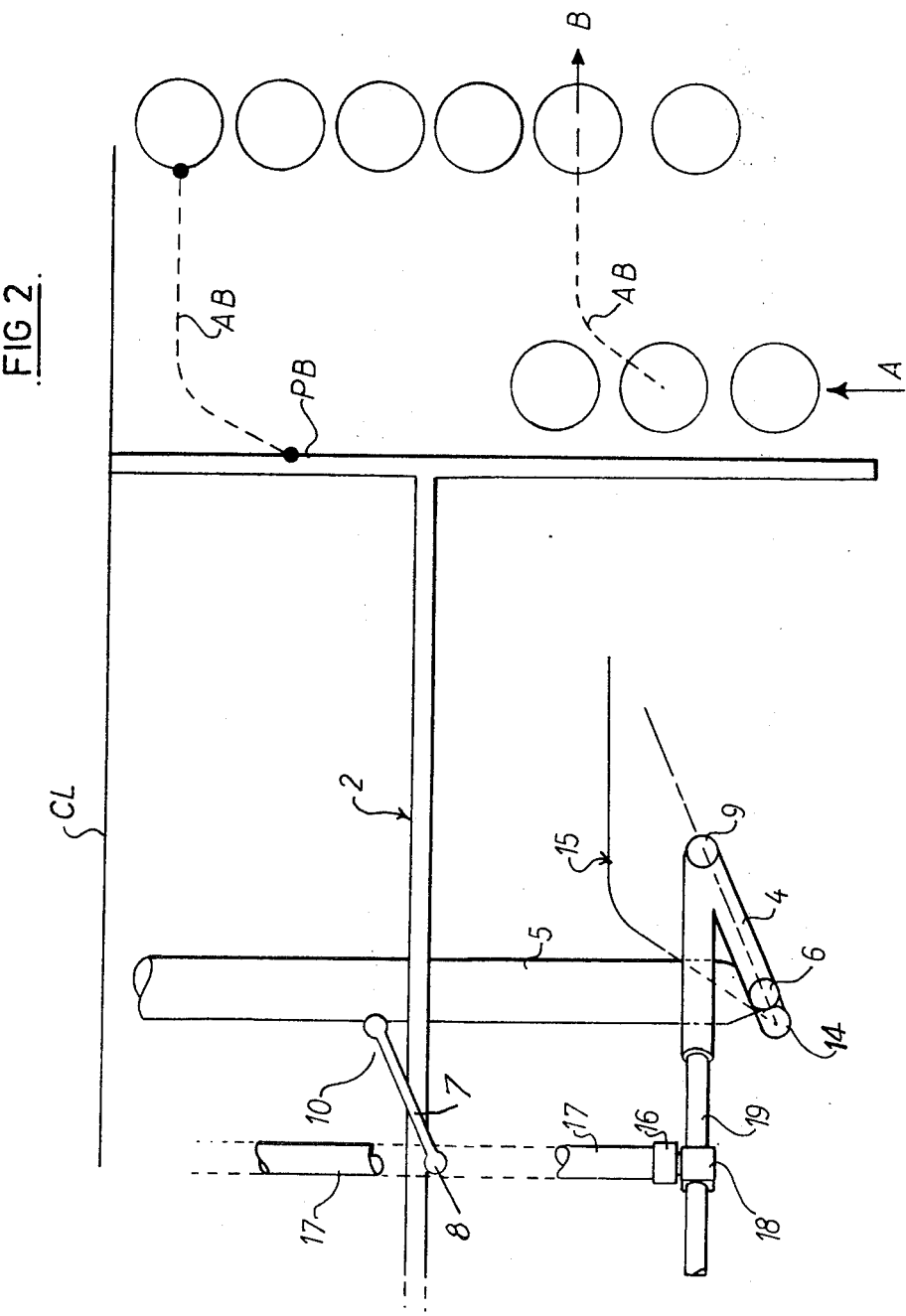

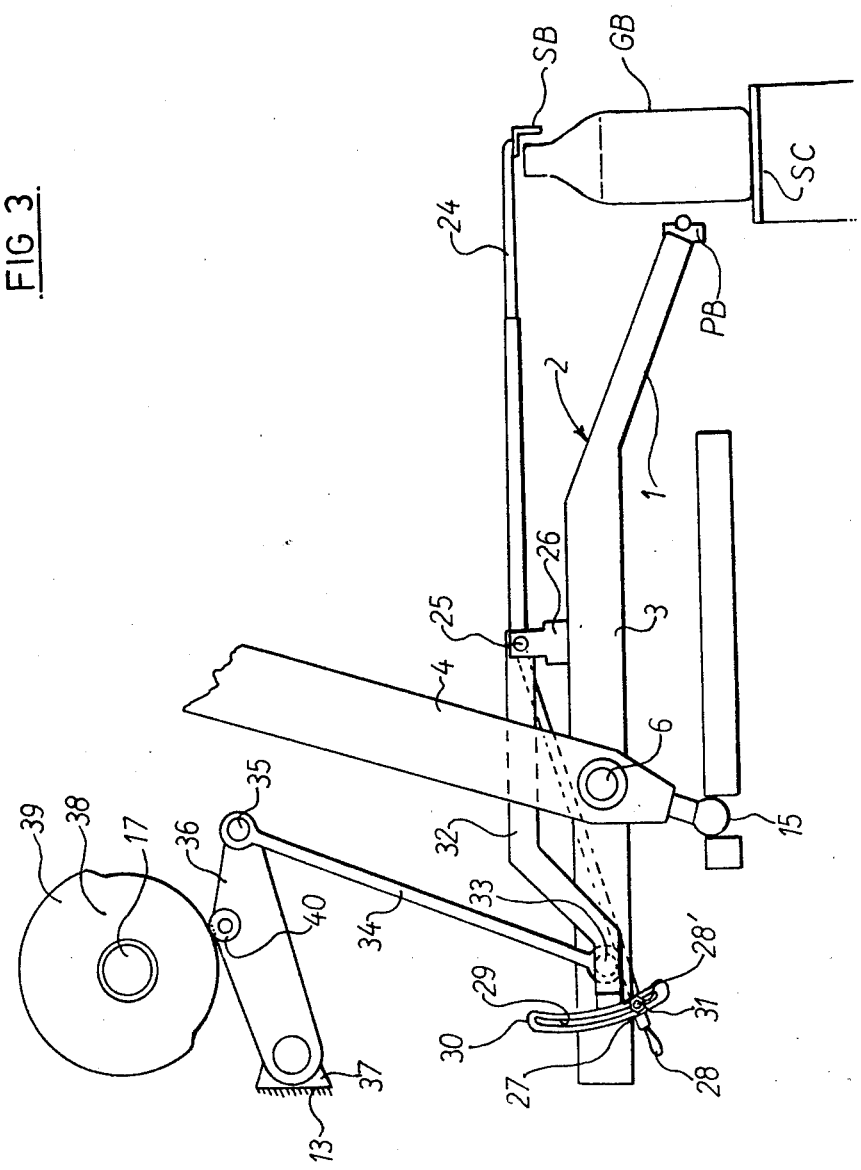

TRANSFER MECHANISM

The present invention relates to a pusher-bar transfer mechanism employing a horizontal movement of a pusher bar to push articles to effect a transfer thereof.

Such a mechanism is employed, for instance, to transfer a line of glass containers from a moving conveyor to a moving belt of a glassware machine such as a lehr.

A known form of such a mechanism is disclosed in British patent specification No. 974,630. This mechanism comprises a support for the pusher bar in the form of depending arms mounted fast or keyed at their upper ends on respective shafts. In a transfer operation, the shafts are advanced axially in the transfer direction and are simultaneously rotated to provide that the depending arms are swung in a plane parallel to the line of articles to be transferred, in the direction in which the articles are received at the pusher bar station. Thus, a compound motion of the pusher bar is achieved, providing a component of motion in the direction parallel to the line of articles and a component of motion transverse to the line of articles in the transfer direction.

A disadvantage of this known mechanism is that it limits the maximum rate of working of the pusher bar to one which is now less than is required; and it also employs moving joints (being those between the depending arms and the pusher bar) in the vicinity of the pusher bar. Since in typical transfer operations for which the mechanism is used, the pusher bar may be submitted to elevated temperatures, the moving joints between the pusher bar and the depending arms may suffer damage.

It is an object of the present invention to provide a pusher-bar transfer mechanism capable of operation effectively at greater than currently achieved transfer rates.

It is also an object of the present invention to provide such a pusher-bar transfer mechanism in which moving joints in the vicinity of the pusher bar may be avoided.

There is provided by the present invention a pusher-bar mechanism for transferring a line of articles, employing a horizontal movement of a pusher bar to effect the transfer by pushing the articles from one side of the line thereof, the mechanism comprising a support for the pusher bar, mounted so as to freely swing or swivel about its mounting, and means for moving the pusher bar through said support in a transfer operation; the arrangement being such that the pusher bar is moved in a horizontal plane in a transfer operation with a component of motion in a direction parallel to the line of articles and a component transverse to the line of articles; and the support being such that the pusher bar is maintained against the articles in a transfer operation without substantially changing its position in relation thereto.

The support may be constituted as an oscillatory system in which the oscillations are forced. It may, therefore, be in the form of a suspension for the pusher bar, which is mounted to undergo a swinging motion in mutually perpendicular planes, the pusher bar being mounted to be supported by the suspension for movement in a horizontal plane. The suspension may comprise depending arms each mounted so that the arm can freely swivel or be swung about its mounting, and for this purpose each arm mounting may comprise a ball joint.

The pusher bar may be secured to one end of an elongate carrier supported from the suspension, and the suspension may comprise a pair of depending arms each mounted at its top end to swivel freely so as to be capable of being swung about the mounting and each further being mounted at the respective bottom ends to the carrier to swivel freely to permit the arms to incline with respect to the carrier; the length of the two arms and the disposition of their mountings being such that the pusher bar in being moved by swinging of the suspension, is maintained in a substantially horizontal plane.

The precise path of the swinging of the suspension may be determined by a guide engaging a suspension arm, e.g., a cam track in which an extension of one of the arms engages.

One of the arms may be connected to the carrier on an axis passing through the rear end of the carrier, that is, the end remote from the pusher bar, while the other arm may be connected to the carrier on an axis passing through a more forward portion of the carrier, and a device may be provided for lifting the pusher bar at the end of a transfer movement above the height of the articles to permit the pusher bar to be withdrawn back to its start position above a further number of articles delivered to the pusher bar station for transfer; the device comprising a lever to depress the rear end of the carrier through the arm connected thereto, and a cam to act on the lever to cause depression of the rear end of the carrier. In this arrangement, the connection of the more forward arm to the carrier acts as a fulcrum about which the carrier turns to lift the pusher bar.

The mechanism of the present invention permits the suspension to be arranged remotely from the pusher bar and thus avoid any need to provide bearings or moving joints in the vicinity of the pusher bar. Consequently, the mechanism of the present invention is particularly suitable for use in applications where the pusher bar is likely to be submitted to heat at levels thereof which would quickly impair the functioning of bearings and moving joints.

The invention will now be further described, by way of example only, with reference to the accompanying drawings in which like reference numerals are used for like parts and in which:

FIG. 2 is a plan sketch view of the embodiment of FIG. 1 on one half of the center line, with parts omitted in the interests of revealing parts that would otherwise be hidden; and FIG. 3 is a sketch in side elevation, of the mechanism of FIG. 1 showing an additional feature not shown in FIG. 1.

Figure 1:
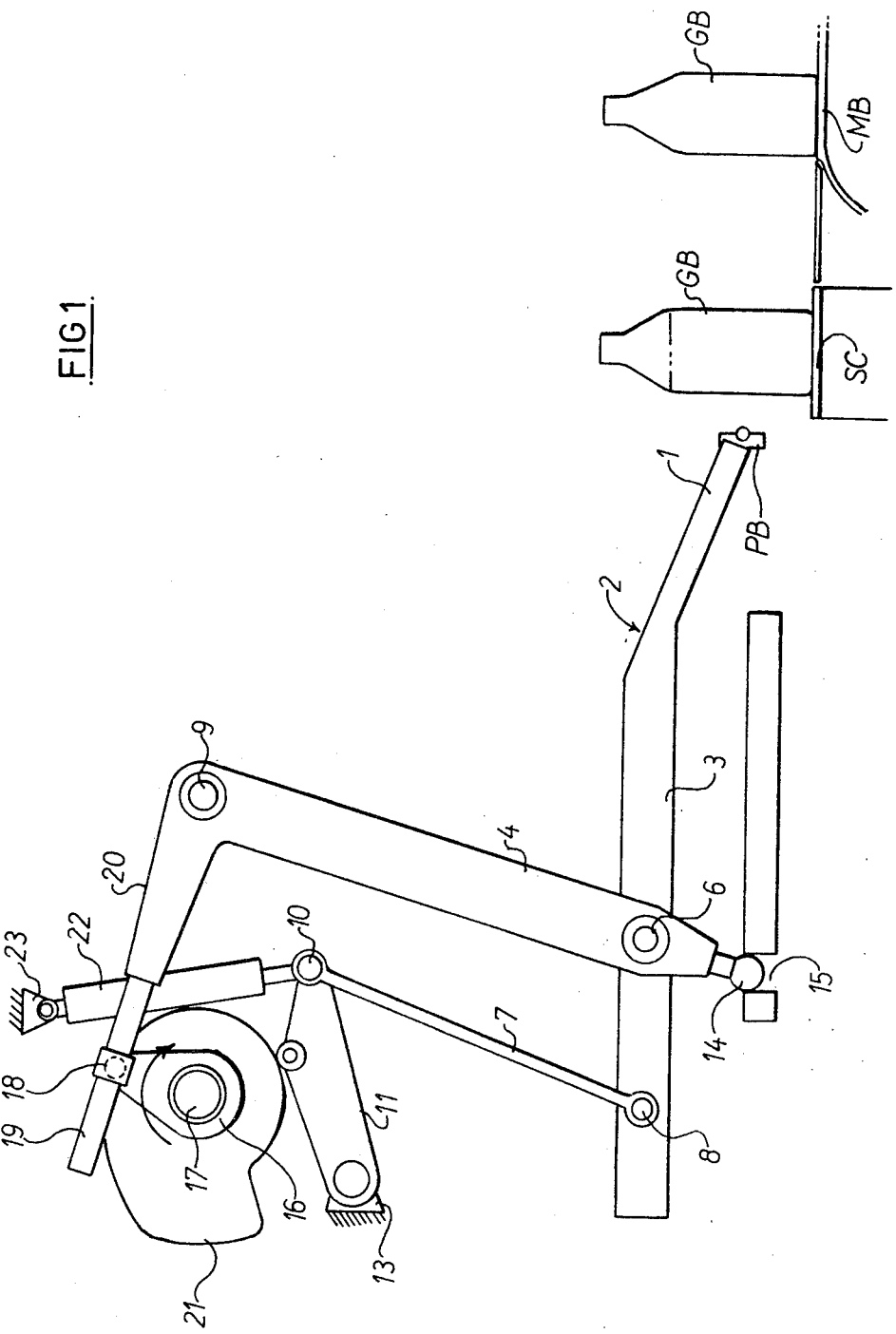
FIG. 1 is a side elevation of a mechanism according to the present invention; the mechanism being symmetrical about a center line thereof.

Referring now to FIGS. 1 and 2 of the drawings, the mechanism comprises a pusher bar PB by which articles, in this instance, glass bottles GB, are transferred from a supply conveyor SC to a conveyor belt MB of a lehr by a pushing action of the pusher bar; the articles being received at the pusher bar station in the direction indicated by the arrow A in FIG. 2 and being removed from their transferred positions by the lehr conveyor in a direction normal to the direction of arrow A as indicated by the arrow B in FIG. 1. The transfer movement is effected not by directly moving the pusher in the direction of arrow B, but by movement of the pusher bar with two components of motion, namely, one in the direction of arrow A and one in the direction of arrow B, over a first part of the transfer operation, and only then by a movement solely in the direction of arrow B. The resultant movement of the pusher bar is indicated by the broken lines AB in FIG. 2. When the pusher bar has completed the transfer with the articles in the far right position as shown in the drawings, it is then lifted clear above the articles and retracted above a further number of articles brought to the receiving station in the interim during which the above-described transfer was made. On returning to the left hand side of the articles at the receiving station as seen in the drawings, the pusher bar is again lowered to its start position.

Since the mechanism of the embodiment is symmetrical about the center line CL as indicated in FIG. 2, only the half of the mechanism appearing one one side of the centre line, namely that shown in FIG. 2, will be specifically described hereinbelow; it being understood that the described half of the mechanism is duplicated in the opposite side of the center line.

As shown in FIG. 2, the respective half of the pusher bar is secured to one end of a downwardly inclined portion 1 of a carrier 2; the carrier comprising a body portion 3 suspended generally to lie horizontally disposed. The suspension comprises a main arm 4, attached to one end of a shaft 5 by a ball joint 6, so that the arm can swivel or swing freely with respect to the shaft, and the shaft passes transversely through the central portion of the body 3 of the carrier. The suspension also comprises a further arm 7 secured by a ball joint 8 to the carrier towards the rear end thereof. The two arms depend from respective mountings or ball joints 9 and 10 so that both arms can swivel or swing freely about their respective ball joints; ball joint 9 being carried in a frame member (not shown) and ball joint 10 at one end of a lever 11 the other end at which is pivoted to a frame member 13 of the mechanism. The pair of arms 4 (only one arm being shown in the drawings) form a first parallelogram linkage with the carrier and the pair of arms 7 form a second parallelogram linkage with the carrier, and the ball joint connections at both ends of the arms allow for free carriage movement or oscillation generally in and compoundedly between mutually perpendicular directions in line with the line of articles or normal to the line of articles. In one preferred embodiment, the linkage arms 7 are selected shorter than the linkage arms 4 so as to act on or depress the rear end of the carrier during this carrier movement and thereby tend to keep the movement of the pusher bar PB substantially in a horizontal plane.

The arm 4 extends below the body 3 of the carrier and bears a ball 14 which is received in a cam track 15 (shown in broken line in FIG. 2) of a cam plate 12.

Motive power to swing the arms is provided from a crank 16 rotating with a shaft 17 and bearing a slider 18 sliding on a further shaft 19 supported in an arm 20 integral with and perpendicular to main arm 4. As the crank rotates, the shaft 19 is worked up and down and thus swings the main arm 4 and consequentially the further arm 7. This swinging motion is guided by the cam track 15 to produce the required mode in the transfer movement of the pusher bar, the guiding movement being permitted because both pairs of linkage arms are free to swing or swivel about the end ball joints. As been noted, the respective lengths of the two arms 4 and 7 and the disposition of their respective ball joints 9 and 10 maintain the pusher bar substantially in a horizontal plane throughout the transfer movement. At the end of this movement, the pusher bar is lifted through the action of the lever 11 and a cam 21 carried by shaft 17, the eccentric of the cam coming down on the lever with the continued rotation of the shaft to urge arm 7 downwardly and, using the ball joint connections of the carrier to the shaft 5 as a fulcrum, levering the pusher bar upwards with the carrier being used as the lever. As shaft 17 continues to rotate, the pusher bar is brought back by the cam track 15 and, as the cam 21 leaves the lever 11, the pusher bar drops down under gravity to assume its start position. To prevent abrupt dropping of the pusher bar, the lever 11 is restrained in its return movement by a dash-pot 22 anchored at one end to the end of lever 11 carrying ball joint 10 and at its other end to a frame member 23 of the mechanism.

The mechanism as described above may readily be fitted with a ware support bar to prevent articles being transferred from being pushed over by the pusher bar. When fitted, the ware-support bar is positioned, just after the start of a transfer operation, on the right hand side of the articles as viewed in the drawings, a little in front of the adjacent top edges thereof to prevent the articles from being tipped forwardly, and travels in this position with the articles until just before the transfer is completed. It then lifts to what may be described as its raised position to clear the top edge of the articles and, on completion of the transfer, is retracted along with the pusher bar to be repositioned above the articles on the right hand side thereof, as viewed in the drawings, while still in its raised position. It is maintained in this position until the pusher bar is about to begin a fresh transfer operation. Then the support bar is dropped to the position first mentioned above.

The ware support bar mechanism is also symmetrical about the center line CL (FIG. 2) and, again, therefore, only half the mechanism, namely, that appearing on one side of the center line, will be specifically described hereinbelow; it being understood that the described half of the mechanism is duplicated on the opposite side of the center line.

The support bar is suspended in a generally similar manner to the pusher bar, as may be seen from FIG. 3. Referring now to FIG. 3, the support bar SB is carried at what may be regarded as the front end of an elongate carrier 24 which is keyed at the opposite, rear, end thereof to pin 25 rotatably mounted in the flanges of a bracket 26 rigidly supported on the body 3 of carrier 2 somewhat to the front of the ball joint connecting the main arm 4 with the carrier 2. The pin 25 also is keyed to one end of a lever or lift arm 27, the other end of which terminates in a handle 28. The lever 27, adjacent the handle 28, bears a bolt 28' by which the lever may be held fast or locked in the slot 29 of a slot piece 30 on tightening of a nut 31 received on the bolt. The slot piece is rigidly supported by a radius arm 32 at one end thereof; the radius arm being mounted on pin 25 freely to rotate thereon. The radius arm, at the end thereof adjacent slot piece 30, carries a ball joint 33 supporting one end of a suspension arm 34 the other end of which is mounted on a ball joint 35 supported at one end of a lever 36; the other end of the lever 36 being pinned to a bracket 37 carried by a frame member of the mechanism. To lie disposed above lever 36, a cam 38 is mounted on shaft 17 to rotate therewith, and the cam bears an eccentric 39 extending over somewhat more than 200° of arc.

The lever 36 also bears a roller 40; and, with the support bar set at some given height, the lever 27 is fastened in the slot piece 30 with the roller 40 bearing against the surface of the cam 38 to maintain an operating relationship therewith. By means of this arrangement, the initial height of the support bar may be set according to the height of the articles to be transferred.

As the pusher bar PB is about to commence a transfer operation, the eccentric 39 leaves the lever 36 and permits the support bar to drop by pivoting on pin 25 to the position, slightly in advance of the upper adjacent edges of the articles, seen in FIG. 3. Since the support bar is indirectly mounted on carrier 2, and since arm 34 may swing around the ball joint 35 in mutually perpendicular vertical planes, the support bar follows the motion of the pusher bar in the transfer operation. However, the eccentric 39 is arranged over an arc such that just before the transfer movement of the pusher bar ends, the eccentric again engages the lever 36 to cause the lever to depress the radius arm 32 and thus lift the support bar to its raised position clear above the articles. When the pusher bar completes the transfer operation, it also is raised, as explained above, and because bracket 25 is disposed somewhat forwardly of the axes about which carrier 2 of the pusher bar turns in the lifting of the pusher bar, the support bar is raised further by the turning of the carrier 2. However, this further raising of the support bar has no operational significance and it arises merely because it is convenient to mount the bracket in the position described on the carrier 2. When the pusher bar is retracted, the support bar is also retracted and is dropped the additional height to which it was raised by the lifting of the pusher bar, when the latter itself is dropped to its start position. Shortly after this instant and just as the pusher bar is about to commence a fresh transfer, the eccentric 39 again leaves the lever 36 to drop the support bar to position ready for the fresh transfer operation.

Since in operation, the support bar is raised only a small amount in relation to the pusher bar, it is permitted to fall freely under gravity when the eccentric 39 of cam 38 leaves the lever 36 and no restraint is used as is the case with the pusher bar.

In order to extend the length of the pusher bar (and of the support bar, if used), the length of shaft, i.e., shaft 5, used between the carriers disposed on each side of centre line CL may be increased; although it will be understood that the entire mechanism may itself be replicated and that, in this case, the length of pusher bar (and support bar, if used) would be increased accordingly.

Because of the movement of the pusher bar effected by the transfer mechanism of the embodiment, there is no abrupt change of direction of the articles being transferred and this safely permits the transfer rates which the oscillatory suspension of the mechanism makes possible.

I claim:

1. A pusher bar transfer mechanism for transferring a line of articles by employing a substantially horizontal movement of the pusher bar to effect the transfer by pushing the articles from one side of the line thereof, said transfer mechanism comprising, in combination, a pusher bar, swingable support means connected to said pusher bar for supporting the same and extending upwardly therefrom to mounting means from which said support means is suspended, said support means being of a type which permits said pusher bar to swing freely in a substantially horizontal plane in and compoundedly between mutually perpendicular directions relative to said mounting means, drive means for swinging said pusher bar relative to said mounting means to effect a transfer operation, guide means including means effecting a specific path of movement of said pusher bar having a first component of motion parallel to said line of articles and a second component of motion transverse to said line of articles, said support means causing said pusher bar to be maintained against said articles during a transfer operation without substantially changing its position relative thereto, said drive means effecting oscillation of said support means thereby producing a return movement of said pusher bar, the support means being in the form of a suspension including depending arms having lower ends, each arm being mounted so that the arm can swing freely about its mountings with the mounting means and the pusher bar, and said guide means being in the form of a cam track in which the lower end of one of said arms engages and which thereby determines the specific path of movement of the pusher bar.

2. A pusher bar transfer mechanism for transferring a line of articles by employing a substantially horizontal movement of the pusher bar to effect the transfer by pushing the articles from one side of the line thereof, said transfer mechanism comprising, in combination, an elongated carrier, a pusher bar mounted on the carrier at one end thereof, swingable support means connected to said carrier for supporting the same and the pusher bar and extending upwardly therefrom to mounting means from which said support means is suspended, said support means being of a type which permits said pusher bar to swing freely in a substantially horizontal plane and in and compoundedly between mutually perpendicular directions relative to said mounting means, drive means for swinging said pusher bar relative to said mounting means to effect a transfer operation, said drive means effecting oscillation of said support means thereby producing a return movement of said pusher bar, the support means being in the form of a suspension including depending arms, each arm being mounted so that the arm can swing freely about its mountings with the mounting means and the carrier, the length of the arms and the disposition of their mountings being such that the pusher bar in being moved by swinging of the suspension is maintained in a substantially horizontal plane, said support means causing said pusher bar to be maintained against said articles during a transfer operation without substantially changing its position relative thereto, and guide means including means effecting a specific path of movement of said pusher bar having a first component of motion parallel to said line of articles and a second component of motion transverse to said line of articles.

3. A transfer mechanism according to claim 2, wherein the carrier is mounted on said arms by means of ball joints.

4. A transfer mechanism according to claim 2, wherein two depending arms are provided, and one of them is connected to the carrier on an axis passing through a portion of the carrier remote from the pusher bar, while the other of the arms is connected to the carrier at a position nearer the pusher bar.

5. A transfer mechanism according to claim 4, further comprising means for raising the pusher bar in a transfer operation above the height of the articles on completion of the transfer thereof, the raising means operating so that on withdrawal of the pusher bar back to the position in which it started the transfer movement, the pusher bar is maintained in the raised position.

6. A transfer mechanism according to claim 5, wherein the raising means comprise a lever to depress the remote end of the carrier through the arm connected thereto, and a cam to act on the lever to cause it to depress the remote end of the carrier with the connection of the other of the arms of the carrier acting as a fulcrum about which the carrier turns to raise the pusher bar.

7. A transfer mechanism according to claim 2, wherein said means for moving the pusher bar through said support further comprises a guide for a suspension arm, the guide determining the path of movement of the pusher bar, a lever acting on another of said arm, a slide mounted for axial sliding movement on the lever, a crank and a crank wheel for driving the crank, the crank being connected to the slide so that on rotation of the crank wheel the lever is worked up and down to cause the other arm to swing about its mounting along with the one arm and, by means of the guide, to effect a transfer movement of the pusher bar.

8. A transfer mechanism according to claim 2, comprising a ware-support bar, an elongate carrier therefor; the ware-support bar being mounted at one end of the carrier and the carrier itself being mounted at a point remote from the ware-support bar on the carrier of the pusher bar to move therewith and position the ware-support bar in a transfer movement to support the articles on the side thereof opposite to that contacted by the pusher bar.

9. A transfer mechanism according to claim 8, further comprising means for raising the ware-support bar in a transfer movement above the height of the articles.

10. A transfer mechanism according to claim 9, wherein said means for raising the ware-support bar are operable independently of the means for raising the pusher bar.

11. A transfer mechanism according to claim 9, wherein the ware-support bar at said remote point is pivotably mounted, and the raising means therefor comprise:

a lift arm connected adjacent one end thereof to the ware-support bar carrier to e rotatable about the pivot axis of the carrier and thereby cause rotation of the carrier therearound;

a suspension arm connected adjacent its lower end relative to the other end of the lift arm, a lever to act on the suspension arm so as to cause pivoting of the ware-support bar carrier, and means for acting on the lever thus to depress the other end of the lift arm in a transfer movement of the pusher bar immediately before transfer of the articles is completed.

12. A transfer mechanism according to claim 11, wherein a radius arm is mounted adjacent one of its ends freely to rotate about said pivot axis independently of the ware-support bar carrier, means being provided for releasably connecting the lift arm adjacent the other end thereof fast with the radius arm at any place along an arc about the pivot axis and said suspension arm being disposed to bear on the other of the ends of the radius arm so that, with the lift arm releasably connected to the radius arm by said means, depression of the other end of the radius arm by the action of said lever depresses the other end of the lift arm to pivot the ware-support bar carrier around the pivotal axis thereof to lift the ware-support bar, and so that, by varying the position in which the lift arm is secured to the radius arm by said means, the height at which the ware-support bar stands before being raised can be adjusted.

13. A transfer mechanism according to claim 12, wherein said means for acting on the lever is a rotatable cam.

14. A transfer mechanism according to claim 2, wherein the mechanism as defined is replicated so that the replicated mechanism is symmetrical about a center line thereof.

15. A pusher bar transfer mechanism for moving a line of articles advancing in a first direction laterally thereof and in a second direction angled relative to said first direction, and along compound components of movement in and between said first and second directions, the combination comprising a pusher bar and a carriage for supporting same, mounting means spaced from the carriage, means for connecting the carriage relative to said mounting means with the pusher bar paralleling the first direction, said connecting means being in the form of two pairs of parallelogram linkages comprised of elongated arms and joint connections between the arms and both the mounting means and the carriage, operable thereby to allow pusher bar movement against the line of articles and laterally therefrom along compound components of movement in and between the first and second directions, guide means spaced from and generally paralleling the carriage and shaped generally according to a specific sequence of compound components of movement desired for the line of articles to follow in moving between the first and second directions, means cooperating between the carriage and the guide means operable to restrict movement of said carriage to only that sequence of said compound components of movement, and means for driving the carriage according to the movements dictated by the guide and cooperating means.

* * * * *